United States Patent
Kosakura

(10) Patent No.: US 9,170,479 B1
(45) Date of Patent: Oct. 27, 2015

(54) ZOETROPE LIGHT EMITTING DEVICE

(71) Applicant: Steven Tadashi Kosakura, Tustin, CA (US)

(72) Inventor: Steven Tadashi Kosakura, Tustin, CA (US)

(*) Notice: Subject to any disclaimer, the term of this patent is extended or adjusted under 35 U.S.C. 154(b) by 0 days.

(21) Appl. No.: 14/302,284

(22) Filed: Jun. 11, 2014

(51) Int. Cl.
| | |
|---|---|
| G03B 25/00 | (2006.01) |
| F21V 33/00 | (2006.01) |
| F21V 23/04 | (2006.01) |
| G03B 23/10 | (2006.01) |
| F21Y 101/02 | (2006.01) |

(52) U.S. Cl.
CPC ............ *G03B 25/00* (2013.01); *F21V 23/0407* (2013.01); *F21V 23/0442* (2013.01); *F21V 33/0052* (2013.01); *G03B 23/10* (2013.01); *F21Y 2101/02* (2013.01)

(58) Field of Classification Search
USPC ............... 353/85; 352/50, 58, 62, 81, 87, 101, 352/102, 129, 126, 239; 40/363, 364
See application file for complete search history.

(56) References Cited

U.S. PATENT DOCUMENTS

| | | | |
|---|---|---|---|
| 1,925,136 A | | 9/1933 | Conover |
| 2,913,954 A | | 11/1959 | Morgan |
| 4,104,625 A | * | 8/1978 | Bristow et al. ................. 353/30 |
| 5,760,874 A | * | 6/1998 | Rudnick ........................ 352/101 |
| 5,870,170 A | * | 2/1999 | Pope ............................. 352/101 |
| 6,097,468 A | | 8/2000 | Muehlenhard |
| 6,647,651 B2 | | 11/2003 | Cutright |
| 7,940,370 B2 | | 5/2011 | Barnett et al. |
| 7,940,371 B2 | * | 5/2011 | Barnett et al. ................. 352/101 |
| 8,139,197 B2 | | 3/2012 | Barnett et al. |
| 8,482,714 B1 | | 7/2013 | Seder |
| 2002/0105808 A1 | | 8/2002 | Ting Yup |
| 2005/0213041 A1 | * | 9/2005 | Schmelzer ...................... 352/87 |
| 2008/0129963 A1 | | 6/2008 | Hohl |
| 2009/0141241 A1 | | 6/2009 | Buyssens |
| 2010/0195054 A1 | | 8/2010 | Gant |
| 2011/0012503 A1 | | 1/2011 | Jackson |
| 2012/0089933 A1 | | 4/2012 | Garand et al. |

OTHER PUBLICATIONS

Wikipedia, Lightguide Display, http://en.wikipedia.org/wiki/Lightguide_display.
Wikipedia, Invisible Ink, http://en.wikipedia.org/wiki/Invisible_ink.

* cited by examiner

*Primary Examiner* — William C Dowling
(74) *Attorney, Agent, or Firm* — Stetina Brunda Garred & Brucker

(57) ABSTRACT

A zoetrope device having a plurality of panels is disclosed. Each of the panels may be formed with one or more indicia representing various objects such as people and things. The panels may be mounted to a rotatable platform that traverses the panels over a light source. When the panel is traversed over the light source, the light source may illuminate the edge of the panel and the indicia formed on the panel. The indicia may be formed at different depths to provide the viewer with an image that appears to be three dimensional. Moreover, the light source may have one or more different light colors for illuminating the indicia therewith and/or alternately illuminating the indicia with different light colors.

19 Claims, 8 Drawing Sheets

ZOETROPE LIGHT EMITTING DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments described herein relate to a zoetrope device.

Prior art zoetrope devices are typically manual devices wherein a slip of paper having a series of images that depict movement of an object is rolled up within a rotating cylindrical platform. The cylindrical platform has a series of slits that the viewer looks through to view the series of images. By doing so, the viewer sees the images having movement. By way of example and not limitation, the images may represent a person walking or doing some other exercise. Unfortunately, prior art zoetrope devices suffer from various deficiencies.

Accordingly, there is a need in the art for an improved zoetrope device.

BRIEF SUMMARY

The various embodiments and methods described herein address the deficiencies described above, described below and those that are known in the art.

A zoetrope device which has a series of light illuminatable indicia formed on a transparent/translucent medium is disclosed. The transparent/translucent medium and the indicia are illuminated by shining a light from a light source against an edge surface of the transparent/translucent medium. The light source may be intermittently turned on and off as the zoetrope device is rotated. Also, the light source may include differing combinations of light colors to provide different colors to the indicia. The indicia may be formed at different depths to provide the viewer with a depth perception of the various indicia being represented on the transparent/translucent media.

More particularly, a zoetrope device comprising a transparent/translucent medium, a light source and a circuit is disclosed. The transparent/translucent medium may have a series of indicia of an object depicting movement of the object. The series of indicia may be formed on the transparent/translucent medium. The transparent/translucent medium arranged as a circle and rotatable about a central axis of the circle. The light source may be disposed immediately adjacent to the transparent/translucent medium. The circuit may selectively activate the light source. There may be one or a plurality of indicia illuminated when the light source is activated.

The light source may be a light emitting diode disposed adjacent to an edge of the transparent/translucent medium. More particularly, the light source may be a plurality of light emitting diodes comprising a first and second color light emitting diodes. The first color light emitting diodes may be selectively turned on and off by the circuit for illuminating the indicia. The second color light emitting diodes may be selectively turned on and off by the circuit for illuminating the indicia.

The zoetrope device may further comprise a motor for rotating the transparent/translucent medium. The motor may increase or decrease a rotating speed of the transparent/translucent medium based on a rate the circuit selectively activates the light source. Alternatively, the circuit may selectively activate the light source based on a rotating speed of the transparent/translucent medium.

The circuit may comprise a power source and a sensor for sensing each indicia. By way of example and not limitation, the indicia may be associated with a ferrous material (e.g., post or ferrous nub). The sensor may sense the ferrous material.

The series of indicia may be etched into the transparent/translucent medium or imprinted onto a surface of the transparent/translucent medium. The series of indicia may comprise a first object and a second object. The first and second objects may be located at different depths from the central axis to provide a depth perception to the viewer of the indicia representing the first and second objects.

The series of indicia may comprise the first object etched or imprinted on a first side of the transparent/translucent medium and the second object etched or imprinted on a second side of the transparent/translucent medium. The transparent/translucent medium may have a sufficient thickness to provide visual depth to the first and second objects to the viewer.

The transparent/translucent medium may comprise a plurality of transparent/translucent panels arranged in a circular formation.

The transparent/translucent medium may include first and second transparent/translucent films and a transparent/translucent base material disposed between the first and second transparent/translucent films.

The transparent/translucent medium may alternatively include first and second transparent/translucent sheets disposed immediately adjacent to each other. Each of the first and second transparent/translucent sheets may have indicia etched or printed thereon.

The transparent/translucent medium may include any further alternative a first transparent/translucent film and a transparent/translucent base material. Each of the first transparent/translucent film and the transparent/translucent base material may have indicia etched or printed thereon.

The light source may be an ultraviolet light source and the indicia printed on the transparent/translucent medium with invisible ink viewable when exposed to the ultraviolet light of the light source.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
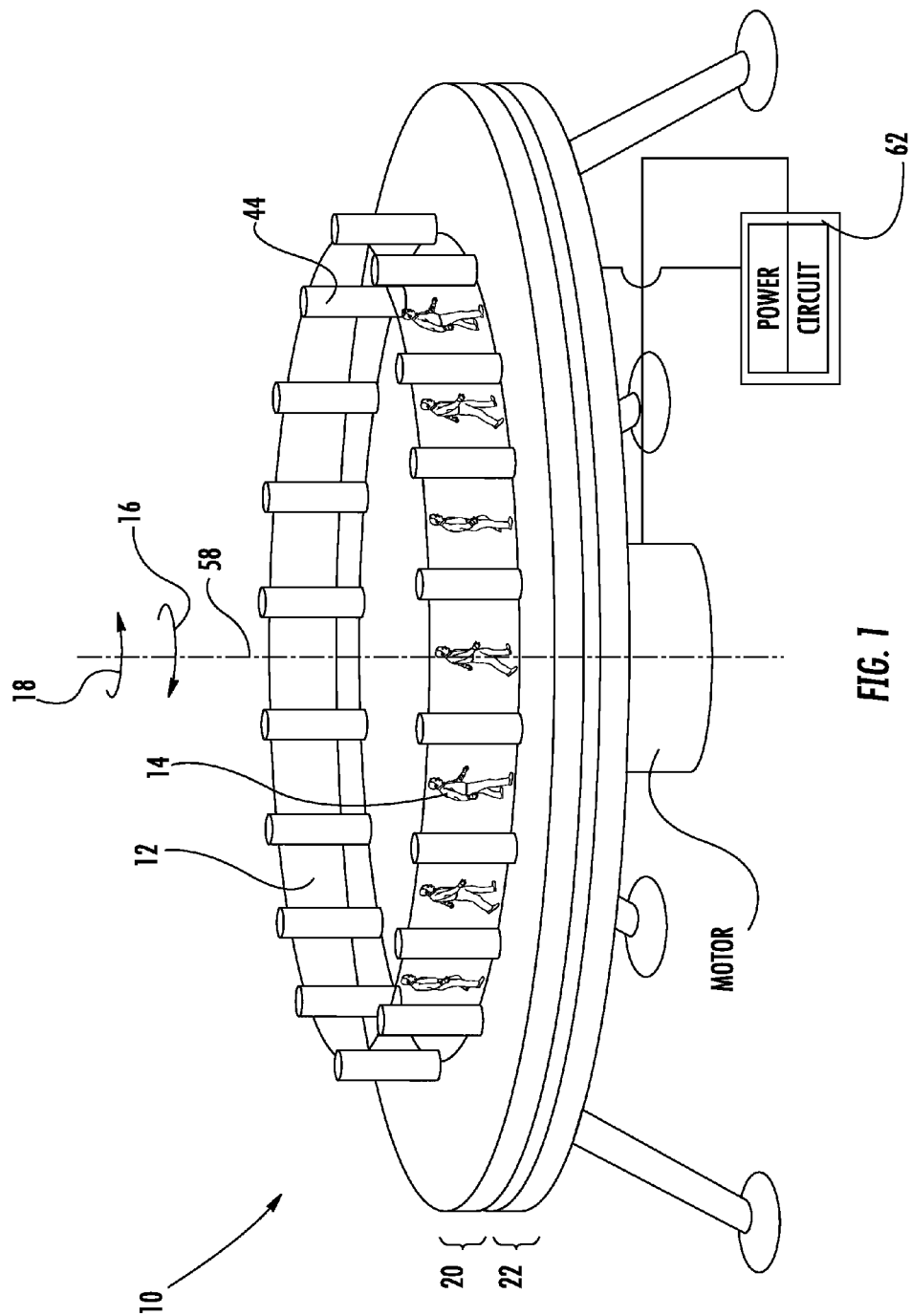
FIG. 1 illustrates a first embodiment of a zoetrope device.

Referring now to the drawings, a zoetrope device 10 having a series of transparent/translucent panels 12 is disclosed. Each panel 12 may have an indicia associated to an indicia formed on an adjacent panel 12 and the indicia 14 on the panels as a group so that the series of indicia 14 on the panels 12 depicts movement. The zoetrope device 10 may be rotatable either in the clockwise direction 16 or in the counter-clockwise direction 18. The transparent/translucent panels 12 may be edge lit and illuminated intermittently. The rate of intermittent illumination of the transparent/translucent panels 12 may correspond to the rate at which the transparent/translucent panels 12 pass a fixed point. When the transparent/translucent panels 12 are illuminated, the light accents the indicia 14 on the transparent/translucent panel 12. A person viewing the zoetrope device 10 experiences an illusion of movement of the indicia 14. Furthermore, the indicia may comprise one or more number of objects (e.g., persons, dogs, trees, inanimate objects, etc.).

Referring now to FIG. 1, the zoetrope device 10 may have a rotating platform 20 and a stationary member 22. The stationary member 22 is shown as being about the same size and having the same configuration as the rotating platform 20. However, it is also contemplated that the stationary member 22 may have other configurations as long as the various purposes of the stationary member 22 are achievable as stated herein. By way of example and not limitation, the stationary member 22 may have a box like configuration. Moreover, the rotating platform 20 may have a circular shape as shown in FIG. 1 but may also have other shapes and is not limited to a circular shape.

The rotating platform 20 may rotate in the clockwise direction as shown by arrow 16 or in the counterclockwise direction as shown by arrow 18. The rotation of the platform 20 may be performed under the power of a motor 24. Alternatively, the rotating platform 20 may ride on a free rotating bearing and be rotatable in the clockwise or counterclockwise directions 16, 18 by simply spinning the rotating platform 20 by hand. The rotating platform 20 itself may be transparent or translucent 12 but is preferably opaque.

Figure 2:
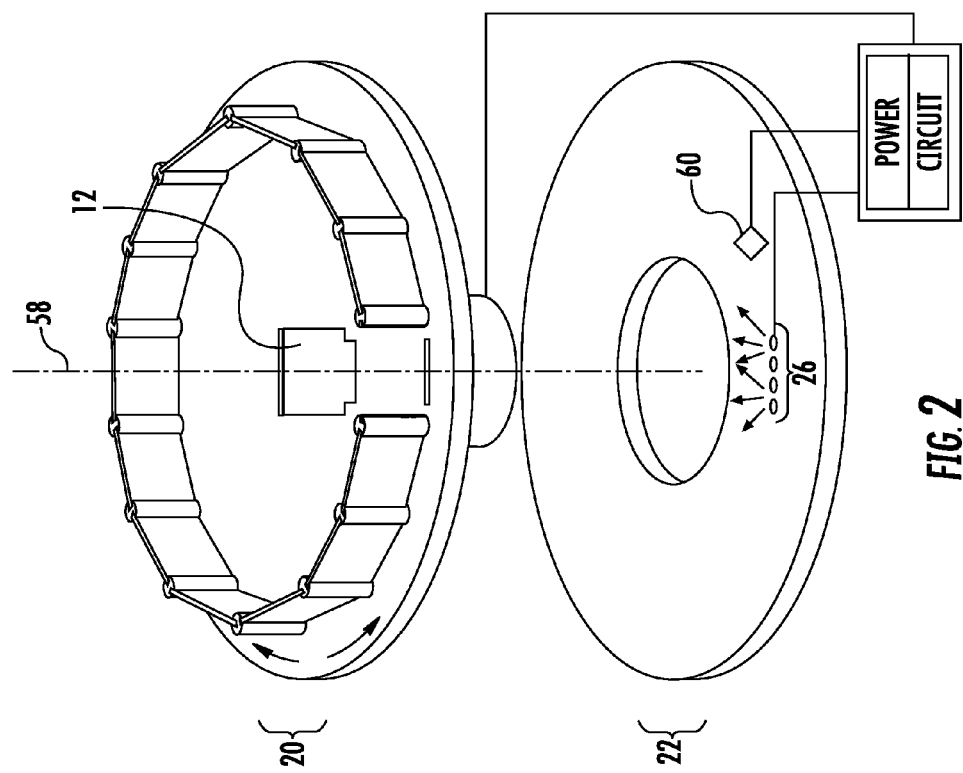
FIG. 2 illustrates an exploded perspective view of the zoetrope device shown in FIG. 1.

Referring now to FIG. 2, the rotating platform 20 is shown as being exploded off of the stationary member 22. The transparent/translucent panels 12 are edge lit from the bottom. In particular, the stationary member 22 may have a plurality of light emitting diodes (LEDs) 26 embedded in the stationary member 22. The plurality of LEDs work as a unit and represent one set of LEDs. Whenever the transparent/translucent panel 12 is traversed over the set of LEDs 26 formed in the stationary member 22, the set of LEDs 26 may light up momentarily to illuminate the edge of the transparent/translucent panel 12. The LEDs may be provided as a single set of LEDs as shown in FIG. 2. In this configuration, the zoetrope device 10 is viewable from primarily the front view which is shown in FIG. 2. However, it is also contemplated that a plurality of sets of LEDs may be embedded in the stationary member 22 about the rotating axis 58 so that the other sets of LEDs illuminate the adjacent panels 12. In this configuration, the zoetrope device 10 is viewable from different sides. The sets of LEDs may be illuminated in simultaneously or they may be illuminated at different times.

Figure 3:
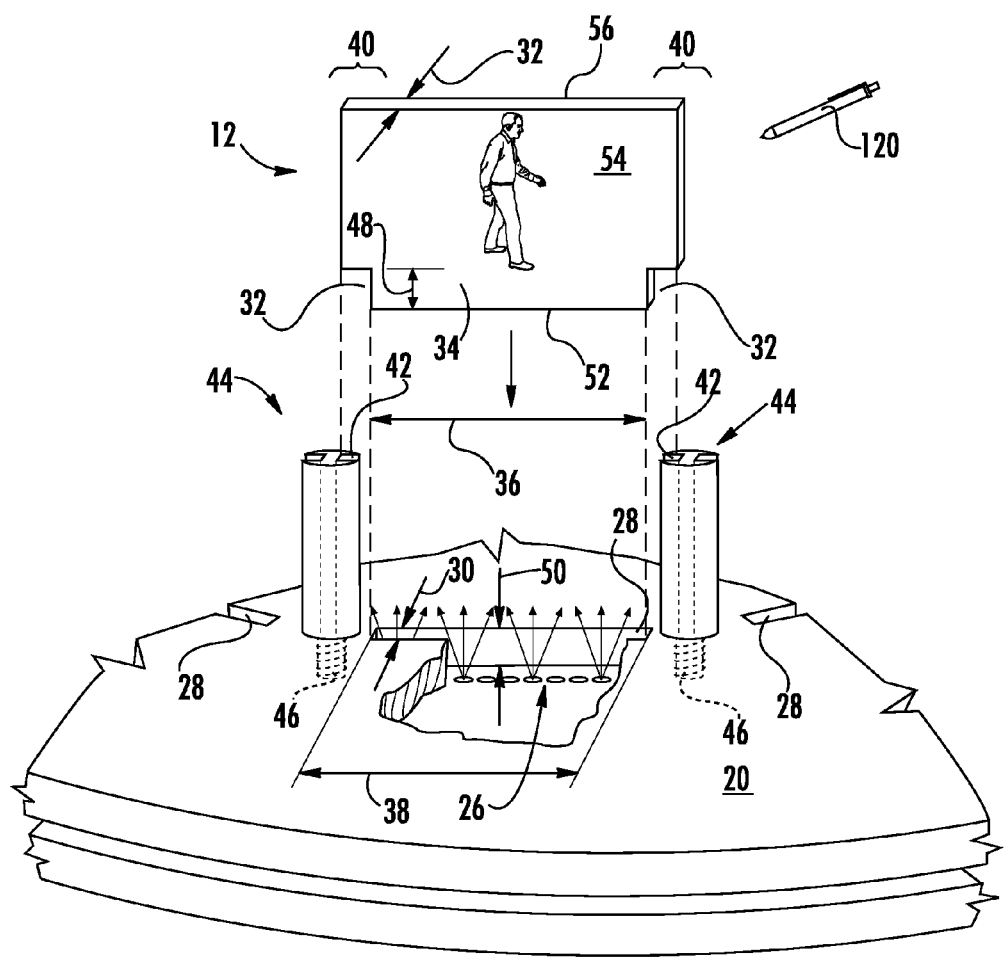
FIG. 3 illustrates an exploded enlarged perspective view of a transparent/translucent panel of the zoetrope device shown in FIG. 2.

The position of the set of LEDs 26 to the transparent/translucent panel 12 is better shown in FIG. 3. The rotating platform 22 may have a series of slots 28. The width 30 of the slots 28 is sufficiently large so that the transparent/translucent panels 12 may fit within the slots 28. In particular, a width 32 of the transparent/translucent panel 12 may be slightly less than the width 30 of the slot 28. The transparent/translucent panel 12 may have notches 32. The tab 34 of the transparent/translucent panel 12 may have a length 36 slightly less than a length 38 of the slot 28. When the tab 34 of the transparent/translucent panel 12 is inserted into the slot 28, the transparent/translucent panel 12 rests on top of the rotating platform 20. The opposed lateral portions 40 of the transparent/translucent panel 12 fit within slots 42 formed in post 44.

The posts 44 may be attached or secured to the rotating platform 20. By way of example and not limitation, the posts 44 may be glued or welded to the rotating platform. As a further alternative, the posts 44 may have a threaded nub 46 that can be threaded into the threaded hole formed in the rotating platform 20. A plurality of posts 44 may be distributed about the rotating platform 20 and the configuration as shown in FIG. 1. A plurality of transparent/translucent panels 12 may be secured to the rotating platform 20, as shown in FIG. 3 and described above. The posts 44, the panels 12 and the LEDs 26 are placed equidistant to the rotating axis 58.

A depth 48 of the tab 34 may be equal to about a thickness 50 of the rotating platform 20 so that a bottom surface of the tab 34 is coextensive with the bottom surface of the rotating platform 20. Preferably, the depth 48 of the tab 34 is sized so that the bottom surface of the tab 34 passes sufficiently close to the LEDs 26 so that upon illumination of the LEDs 26, the transparent/translucent panel 12 is illuminated. The set of LEDs 26 are positioned so that the LEDs 26 when illuminated shine light directly into the bottom edge surface 52 of the tab 34 of the transparent/translucent panel 12. When the set of LEDs 26 are illuminated, the edge surface 52 is immediately above the set of LEDs 26. The illumination of the LEDs 26 illuminate the transparent/translucent panel 12 and more particularly, highlights the indicia 14.

The indicia 14 may be an etching or other process formed on the transparent/translucent panel 12 capable of being illuminated by the light of the LEDs 26. The indicia 14 may be placed on the front side 54 of the transparent/translucent panel 12 and a different indicia 14 may be placed on the backside 56 of the transparent/translucent panel 12 in order to provide a sense of depth to the viewer. By way of example and not limitation, the indicia 14 on the front side 54 may be that of a person, whereas, the indicia 14 on the backside 56 may be a tree. The combination of the indicia 14 on the front and back sides 54, 56 of the transparent/translucent panel 12 may illustrate a person walking next to a tree wherein the person is in front of the tree. By illuminating indicia at different depths from the perspective of the viewer, the zoetrope device 10 allows for depth perception of the indicia. Also, by timing illumination of the LEDs 26, the person (i.e., indicia 14) can appear to be walking left to right or doing other movements.

Referring back to FIG. 1, the zoetrope device 10 may have a plurality of transparent/translucent panels 12 that rotate in a circular fashion about rotating axis 58. Each of the transparent/translucent panels 12 will eventually be traversed over the set of LEDs 26 at which time the LEDs 26 will illuminate in order to illuminate the transparent/translucent panel 12 and the indicia 14 formed on the transparent/translucent panel 12.

The set of LEDs 26 may be constantly on and illuminate only the transparent/translucent panel 12 disposed directly over the LEDs 26. Alternatively, the LEDs 26 may be intermittently turned on for a period of time. The midpoint of each period of time may occur when the length 36 of the tab 34 is centered on the set of LEDs 26. The period of time may be adjusted depending on the rotational speed of the rotating platform 20 and the length 38 of the slot 28 so that the set of LEDs 26 when illuminated do not illuminate adjacent panels 12.

The LEDs 26 may be turned on with the use of a sensor 60. The sensor 60 may be a ferrous material sensor. By way of example and not limitation, the sensor 60 may be fixed to the stationary member 22, as shown in FIG. 2. The posts 44 may be fabricated from a ferrous material and be aligned to be sensed by the sensor 16. As such, as the rotating platform 20 rotates about the rotating axis 58, the sensor 60 senses the post 44. The sensor 60 may send a signal to a circuit 62 to control timing of the illumination of the set of LEDs 26. In particular, the circuit 62 may control the start time and the duration of the illumination of the set of LEDs. As discussed above, preferably, a midpoint of the period of time for which the set of LEDs 26 is turned on may occur when the length 36 of the tabs 34 is centered on the set of LEDs 26. Preferably, a maximum length of time for which the set of LEDs is illuminated may be set so that the set of LEDs 26 do not illuminate adjacent panels 12. Alternatively, instead of sensing the posts 44, a ferrous nub may be embedded into the rotating platform 20 in sync with the posts 44 or the transparent/translucent panels 12. The sensor 60 may detect the ferrous nub to turn on and off the LEDs.

If the zoetrope device 10 is non-motorized, then a person may spin the rotating platform 20 by hand. The sensor 60 may sense the posts 44/ferrous nub and intermittently turns on the LEDs 26 to illuminate the indicia 14 formed on the transparent/translucent panels 12. Since the indicia 14 on the panels 12 show increments of movement, the person views movement of the indicia 14 as each adjacent panel 12 is illuminated. The zoetrope device 10 may also be motorized so that a motor 62 rotates the rotating platform 20.

Figure 4:
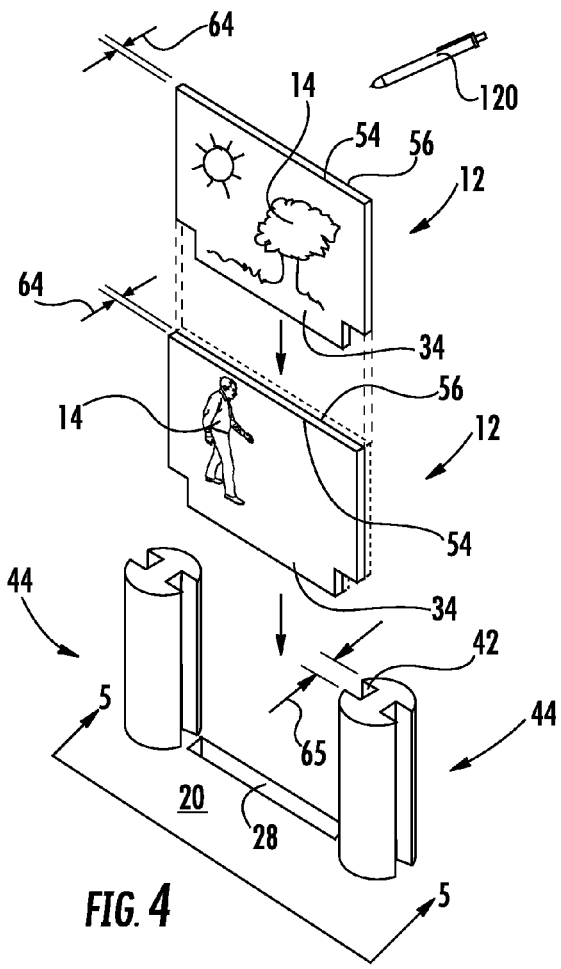
FIG. 4 illustrates an exploded perspective view of another embodiment of the transparent/translucent panel shown in FIG. 3.

Referring now to FIG. 4, another means for providing for depth perception is provided. In particular, instead of forming indicia 14 on the front and back sides 54, 56 of one transparent/translucent panel 12, the indicia 14 may be distributed amongst two or more panels 12 that are stacked one in front of the other. By way of example and not limitation, the indicia 14 may be formed on the front sides 54 of the transparent/translucent panels 12 shown in FIG. 4. Alternatively, the indicia 14 may be formed on the backsides 56 of the transparent/translucent panels 12. Alternatively, the indicia 14 may be formed on the front side 54 of the front panel 12 and on the backside 56 of the rear panel 12. Preferably, the indicia 14 is not formed on the backside 56 of the front panel 12 and the front side 54 of the rear panel 12.

Figure 5:
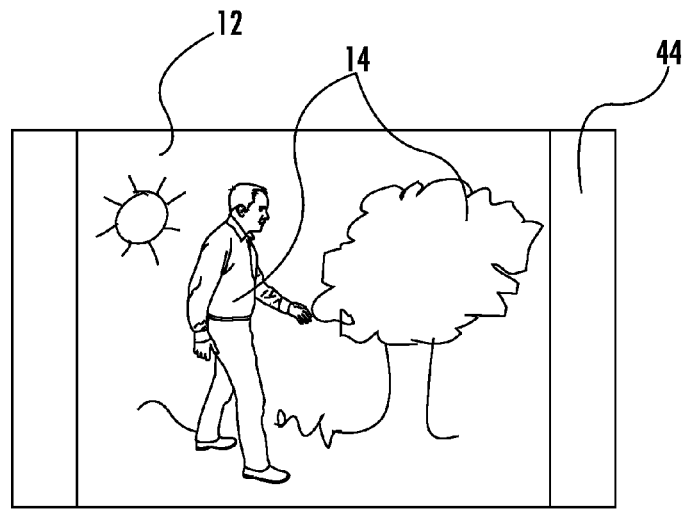
FIG. 5 illustrates a front view of the transparent/translucent panel shown in FIG. 4.

Each of the panels 12 define a thickness 64 which may be identical to each other or different. The total thickness of the panels 12 being stacked upon each other may fit within slot 42 of the post 44 and the slot 28. In this regard, the sum of the thicknesses 64 of the panels 12 may equal or be slightly smaller than a width 64 of the slot 42 formed in the post 44 and the width 30 of the slot 28. When the panel 12 is assembled onto the rotating platform 20, a front view of the stacked panels 12 is shown in FIG. 5.

Figure 6:
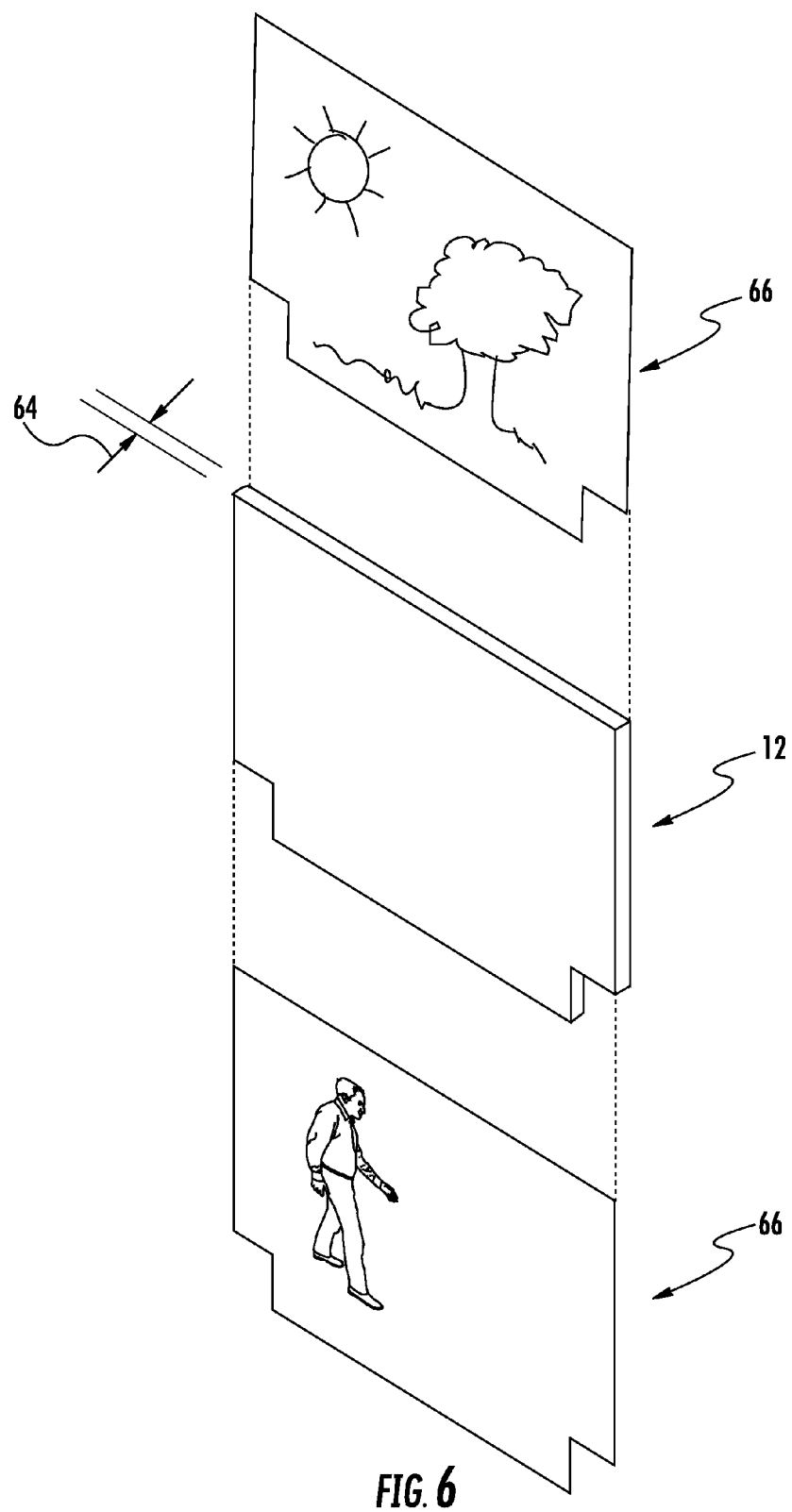
FIG. 6 illustrates an exploded perspective view of another embodiment of the transparent/translucent panel shown in FIG. 3.

Referring now to FIG. 6, another means for providing for depth perception is provided. In particular, a single transparent/translucent panel 12 is shown. Two film layers 66 are disposed on opposed sides of the transparent/translucent panel 12. Indicia 14 is formed on each of the film layers 66. Since the film layers 66 are separated by the thickness 64 of the transparent/translucent panel 12, the indicia 14 formed on the film layers 66 provide a depth perception. The stack of film layers 66 and transparent/translucent panel 12 may be mounted to the rotating platform 20 and the post 44 in the manner described above in relation to the other embodiments.

Figure 7:
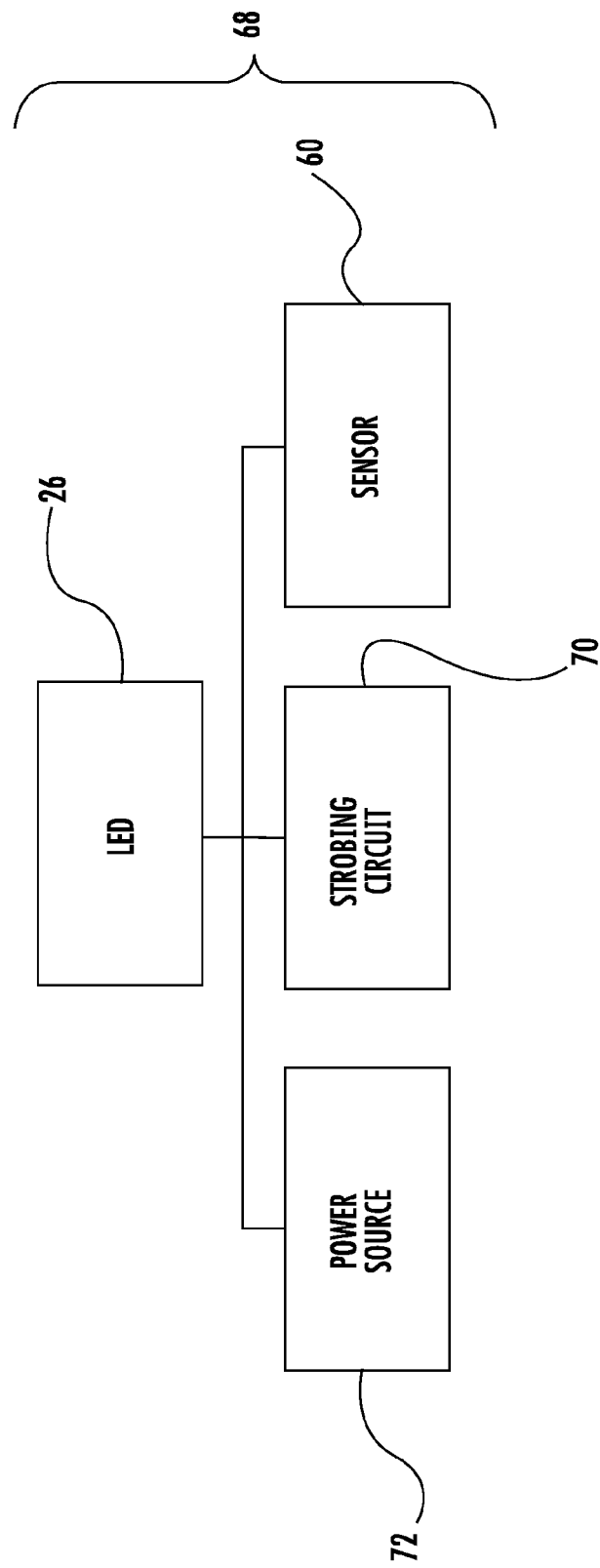
FIG. 7 illustrates a schematic view of an electronic circuit for controlling intermittent illumination of LEDs.

Referring now to FIG. 7, an electronic circuit 68 for controlling the intermittent illumination of the LEDs 26 is shown. The set of LEDs 26 is turned on and off by a strobing circuit 70. The strobing circuit 70 is activated when the sensor 60 mounted to the stationary member 22 senses a ferrous material. The sensor 60 senses a ferrous material mounted on the rotating platform 20. When the sensor 60 senses the ferrous material, the sensor 60 sends a signal to the strobing circuit 70. The strobing circuit 70 controls power from a power source 72 to the LED 26 to intermittently illuminate the LEDs 26. The sensor 60 is described as a ferrous sensor. However, other types of sensors are also contemplated such as a speed sensor, a proximity sensor or digitally derived triggering from a position encoder.

Figure 8:
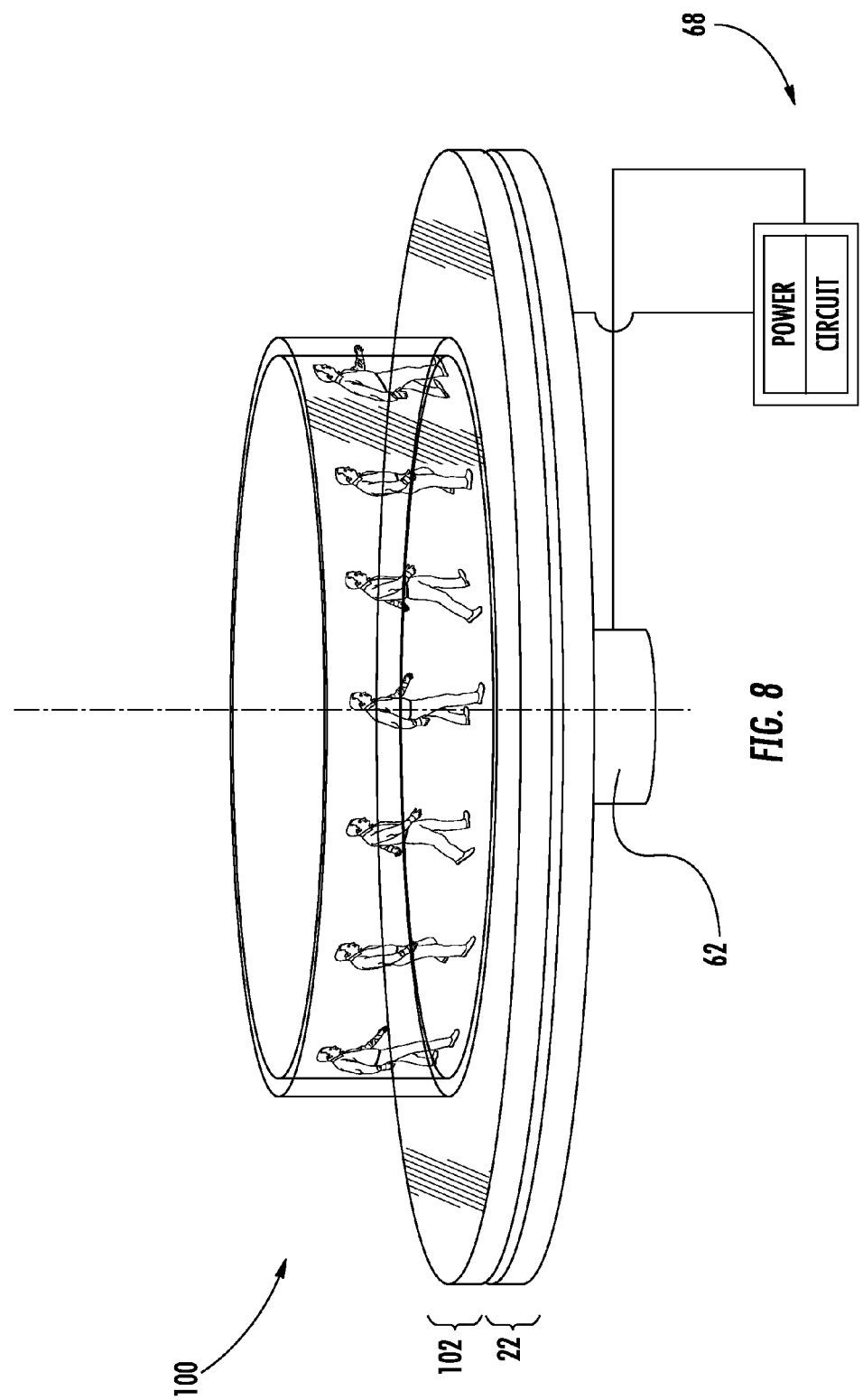
FIG. 8 illustrates a second embodiment of the zoetrope device.
Figure 9:
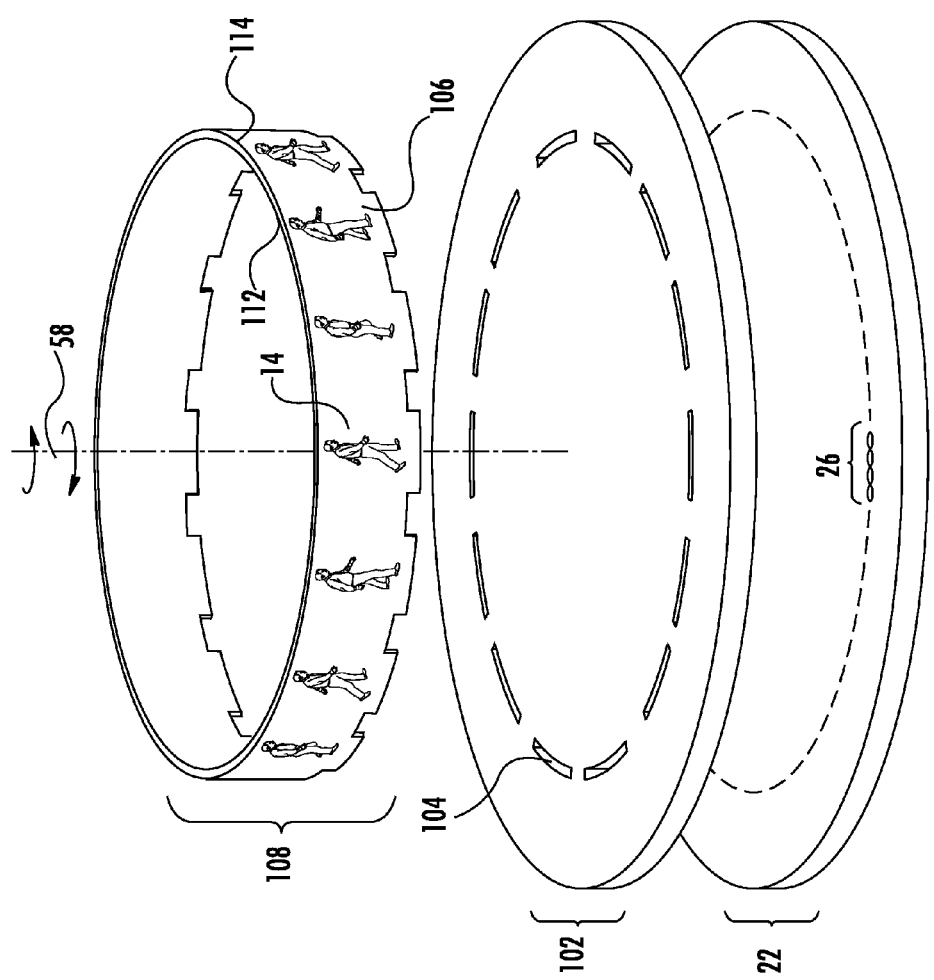
FIG. 9 illustrates an exploded perspective view of the second embodiment of the zoetrope device shown in FIG. 8.

Referring now to FIGS. 8-10, a second embodiment of the zoetrope device 100 is shown. The zoetrope device 100 has a stationary member 22 and circuit 68 for controlling LEDs 26 in the stationary member 22. The zoetrope device 100 may have an optional motor 62 for rotating the rotating platform 102. The zoetrope device 100 operates in substantially the same manner as the zoetrope device 10 shown in FIGS. 1-7 except that the rotating platform 102 and the medium upon which the indicia 14 is formed are fabricated with a different structure. In particular, as shown in FIG. 9, the rotating platform 102 may have a plurality of slots 104. These slots 104 correspond with castellated tabs 106 formed in a transparent/translucent cylindrical object 108. The object 108 may be secured to the rotating platform 102 by inserting the tabs 106 of the object 108 into the slots 104 of the rotating platform 102. When the slot 104 traverses over the LEDs 26, the LEDs 26 are illuminated and shine against the bottom surface 110 of the tab 106. The LEDs 26 and the bottom surfaces 110 of the tabs 106 are equidistant from the rotating axis so as to be aligned to each other. The LEDs 26 illuminate the transparent/translucent cylindrical object 108 from its edge 110.

The indicia 14 may be placed on the outer surface 112, the inner surface 114 or both the inner and outer surfaces 112, 114. In this manner, depth perception may be provided by forming indicia 14 on both the inner and outer surfaces 114, 112 of the transparent/translucent cylindrical object 108. By way of example and not limitation, indicia 14 of a person may be formed on the outer surface 112. A series of indicia 14 may illustrate a person walking. An indicia 14 of a tree may be formed on the inner surface 114. In this manner, the tree appears to be in the background, whereas, the person appears to be in the foreground. The indicia 14 of the person may appear to be walking in front of the indicia 14 of the tree. The indicia 14 formed on the inner and/or outer surfaces 112, 114 may be aligned above the tabs 106.

The LEDs 26 embedded in the stationary member 22 may all be of the same color. For example, the LEDs 26 may all be yellow, red, blue, etc. However, it is also contemplated that the set of LEDs 26 for illuminating a single transparent/translucent panel 12 or scene may comprise LEDs 26 having two or more colors. The LEDs 26 of the same color may be illuminated at the same time. By way of example and not limitation, the set of LEDs 26 may have LEDs 26 that provide a red color and a green color. The green LED(s) 26 will illuminate at the same time. The red LED(s) 26 will illuminate at the same time. The red and green LEDs 26 may illuminate at the same time or different times. The LEDs 26 may be controlled by strobing circuit 70.

The indicia 14 was described as an etching formed on the exterior surfaces of the transparent/translucent panel 12. It is also contemplated that the indicia may be a 3D image. However, it is also contemplated that the indicia 14 may be formed with a pen 120 (see FIG. 3) having a light activated ink. When the indicia 14 is formed with light activated ink, the LEDs 26 may be replaced with LEDs 26 that produce a light that activates the light activated ink or makes the light activated ink visible to a viewer or person. By way of example and not limitation, the ink may be fluorescent visible ink. In the absence of fluorescent light, the fluorescent visible ink is invisible. The LEDs 26 may be replaced with fluorescent producing light. Other pairings are also contemplated. By way of example and not limitation, the indicia 14 may be formed with an ink activated or viewable with ultraviolet light. In this regard, the indicia 14 may be formed with the ultraviolet light activatable by the LEDs 26 which may be ultraviolet light producing LEDs 26.

The above description is given by way of example, and not limitation. Given the above disclosure, one skilled in the art could devise variations that are within the scope and spirit of the invention disclosed herein, including various ways of rotating the rotating platform 20. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A zoetrope device comprising:
a transparent/translucent medium with a series of indicia of an object depicting movement of the object, the series of indicia formed on the medium, the transparent/translucent medium arranged as a circle and rotatable about a central axis of the circle;
a plurality of light emitting diodes disposed adjacent to an edge of the transparent/translucent medium;
a circuit for selectively activating the light source;
wherein the indicia is illuminated when the tight source is activated;
wherein the plurality of light emitting diodes comprising first and second color light emitting diodes, the first color light emitting diodes being selectively turned on and off by the circuit for illuminating the indicia, the second color light emitting diodes being selectively turned on and off by the circuit for illuminating the indicia.

2. The zoetrope device of claim 1 further comprising a motor for rotating the transparent/translucent medium, the motor increasing or decreases a rotating speed of the transparent/translucient medium based on a rate the circuit selectively activates the light source.

3. The zoetrope device of claim 1 further comprising a motor for rotating the transparent/translucent medium, the circuit selectively activating the light source at a rate based on a rotating speed of the transparent/translucent medium.

4. The zoetrope device of claim 3 wherein the circuit comprises a power source and a sensor for sensing each indicia.

5. The zoetrope device of claim 1 wherein the series of indicia are etched into the transparent/translucent medium or imprinted onto a surface of the transparent/translucent medium.

6. The zoetrope device of claim 1 wherein the transparent/translucent medium comprises a plurality of transparent/translucent panels arranged in a circular formation.

7. The zoetrope device of claim 1 wherein the transparent/translucent medium includes first and second transparent/translucent, films and a transparent/translucent base material disposed between the first and second transparent/translucent films.

8. The zoetrope device of claim 1 wherein the transparent/translucent medium includes first and second transparent/translucent sheets disposed immediately adjacent to each other, each of the first and second transparent/translucent sheets having indicia etched or printed thereon.

9. The zoetrope device of claim 1 wherein the transparent/translucent medium include a first transparent/translucent film and a transparent/translucent base material, each of the first transparent/translucent film and the transparent/translucent base material having indicia etched or printed thereon.

10. A zoetrope device comprising:
a transparent/translucent medium with a series of indicia of an object depicting movement of the object, the series of indicia formed on the medium, the transparent/translucent medium arranged as it circle and rotatable about a central axis of the circle;
a light source disposed immediately adjacent to the transparent/translucent medium;
a circuit for selectively activating the light source;
wherein the indicia is illuminated when the light source is activated;
wherein the series of indicia comprise a first object and a second object, the first and second objects are located at different depths from the central axis.

11. The zoetrope device of claim 10 wherein the series of indicia comprises the first Object etched or imprinted on a first side of the transparent/translucent medium and the second object etched or imprinted on a second side of the transparent/translucent medium, and wherein the transparent/translucent medium has a sufficient thickness to provide visual depth to the first and second objects.

12. The device of claim 10 further comprising a motor for rotating the transparent/translucent medium, a rotating speed of the transparent/translucent medium which is controlled by the motor being timed to a rate the circuit selectively activates the light source.

13. The device of claim 10 wherein the circuit comprises a power source and a sensor for sensing each indicia.

14. The device of claim 10 wherein the light source is a plurality of light emitting diodes comprising first and second color light emitting diodes, the first color light emitting diode being selectively turned on and off by the circuit for illuminating the indicia, the second color light emitting diode being selectively turned on and of by the circuit for illuminating the indicia.

15. A zoetrope device comprising:
a transparent/translucent medium with a series of indicia of an object depicting movement of the object, the series of indicia formed on the medium, the transparent/translucent medium arranged as a circle and rotatable about a central axis of the circle;
a light source disposed immediately adjacent to the transparent/translucent medium;
a circuit for selectively activating the light source;
wherein the indicia is illuminated when the light source is activated;
wherein the light source is an ultraviolet light source and the indicia printed on the transparent/translucent medium with invisible ink, fluorescent ink and/or pigment.

16. The device of claim 15 wherein the series of indicia comprise a first object and a second object, the first and second objects are located at different depths from the central axis.

17. The device of claim 15 further comprising a motor for rotating the transparent/translucent medium, a rotating speed of the transparent/translucent medium which is controlled by the motor being timed to a rate the circuit selectively activates the light source.

18. The device of claim 15 wherein the circuit comprises a power source and a sensor for sensing each indicia.

19. The device of claim 15 wherein the light source is a plurality of light emitting diodes comprising first and second color light emitting diodes, the first color light emitting diode being selectively turned on and off by the circuit for illuminating the indicia the second color light emitting diode being selectively turned on and off by the circuit for illuminating the indicia.

* * * * *